March 10, 1953  A. F. BABIS  2,631,183
VENT CAP HYDROMETER FOR ELECTRIC STORAGE BATTERIES
Filed Jan. 17, 1951
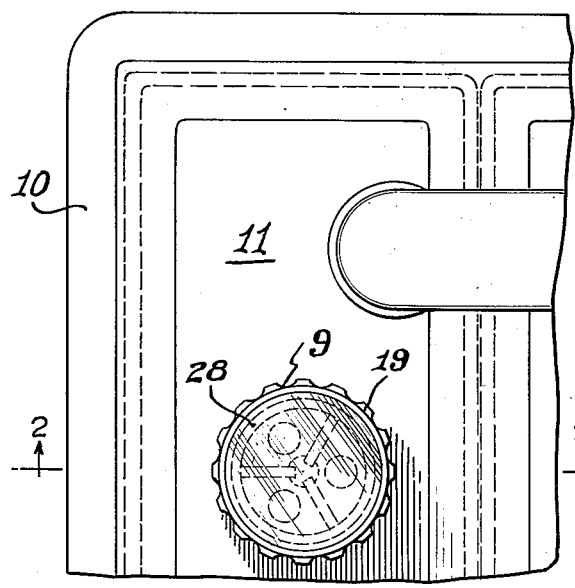
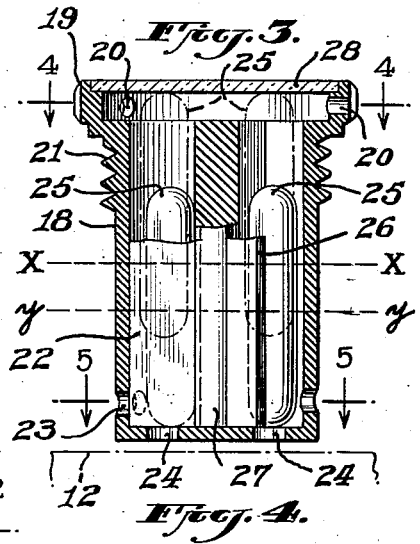
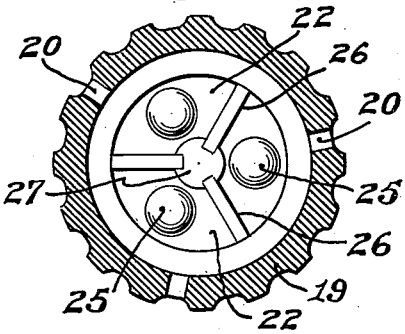
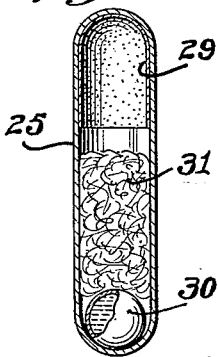
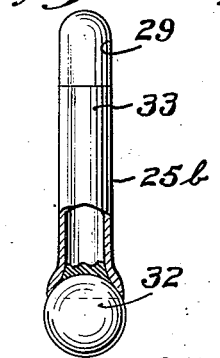
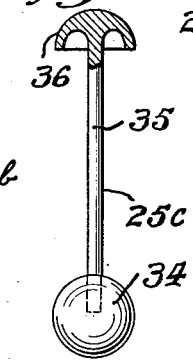
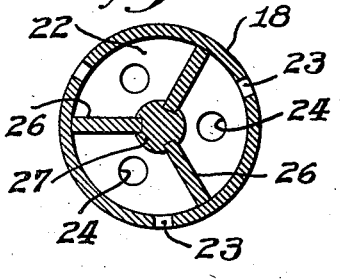
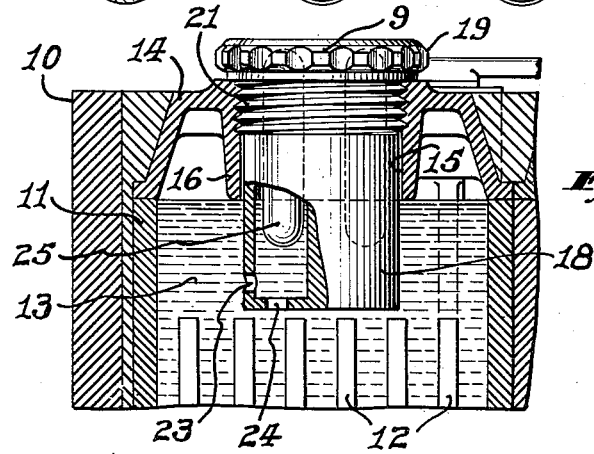
INVENTOR.
ALEXANDER F. BABIS.
BY John Babis, Jr.
ATTORNEY.

Patented Mar. 10, 1953

2,631,183

UNITED STATES PATENT OFFICE 2,631,183

VENT CAP HYDROMETER FOR ELECTRIC STORAGE BATTERIES

Alexander F. Babis, Philadelphia, Pa.

Application January 17, 1951, Serial No. 206,457

11 Claims. (Cl. 136—182)

This invention relates to hydrometric devices and more particularly to devices of this character which are adapted to be removably associated with a conventional electric storage battery of the lead plate, high-level electrolyte reserve type as a permanent part thereof.

More specifically, the invention has reference to a hydrometric indicator device of the plural element, "basket" type which includes a hollow transparent vent plug as an integral part thereof and one of which is adapted to be removably secured in each of the filling openings of a conventional electric storage battery of the high-level electrolyte reserve type.

An object of the invention is to provide a unitary vent plug and hydrometer combination for each plate cell of an electric storage battery of the high-level, electrolyte reserve type, which vent plug and hydrometer combination may constitute an original component of a battery and may be so utilized with a minimum of change in the internal design of conventional batteries and without requiring any changes in the exterior design or dimensions thereof.

Another object of the invention is to provide a combined vent plug and hydrometer which is adapted to be removably retained, one in each filling opening in a conventional electric storage battery of a high-level electrolyte reserve type whereby one of a plurality of predetermined density values of the electrolyte obtaining in the battery, or the need for additional water, may be visually determined without removing any of the devices from the battery.

A further object of the invention is to provide a hollow, transparent vent plug and a hydrometer of the plural element, "basket" type as an integral unit which is adapted to be removably secured, one in each filling opening in an electric storage battery of the high-level electrolyte reserve type whereby a defective plate cell may be visually detected without removing any of the units from the battery.

Another object of the invention is to provide a hollow vent plug having a flat, transparent top face and a plural element, "basket" type hydrometer as an integral concentric unit which is adapted to be removably secured, one in each filling opening in a storage battery of the high-level electrolyte reserve type, whereby the hydrometer continuously reacts to at least one of a plurality of predetermined specific gravity values of the electrolyte in each plate cell, when above a minimum value and at substantially normal level, and provides a visual indication thereof at the top face of the vent plug.

A still further object is to provide a device which is simple and inexpensive in design, dependable and accurate in operation and which may be applied and removed with facility.

The invention is illustrated in the accompanying drawing, wherein:

Figure 1 is a fragmentary top view of a standard battery showing associated therewith an indicating device embodying the features of the invention;

Figure 2 is a fragmentary vertical section through the battery taken along line 2—2 of Figure 1;

Figure 3 is an enlarged sectional view of the indicating device;

Figures 4 and 5 are horizontal sections taken along lines 4—4 and 5—5, respectively, of Figure 3;

Figure 6 is an enlarged vertical section through one of the hydrometric elements of the device; and Figures 7 and 8 are views, partially in elevation and partially in section, of other forms of hydrometric elements.

The indicating device, indicated at 9, is illustrated by way of example in connection with a standard battery of the type which is designed to accommodate a high-level reserve supply of electrolyte above the plates. The battery, indicated at 10, is sufficiently illustrated for the purpose in view by a fragmentary showing of one end thereof, one cell of the battery being indicated at 11. The plates of the cell 11 are indicated at 12 and the electrolyte at 13, the normal high-level of the latter (indicated at X) being well above the top edges of the plates in order to provide a reserve supply. The cover 14 of the cell is, in accordance with conventional practice, formed with a filling opening 15, the wall of the latter being threaded at its entrance and including a depending sleeve 16. The indicating device 9 not only performs its intended functions but serves as a vent cap for the filling opening 15.

The indicating device may take various forms. As illustrated, it includes a tubular housing 18 which may be formed of a transparent plastic, or any other suitable material. The housing 18 is closed at both ends and, except for the upper end 19, is of such a diameter that it may readily be inserted through and withdrawn from the filling opening 15. The upper end 19 of the housing is in the form of a cap-piece so that the housing may be manipulated in the manner of a conventional vent cap, vent openings 20 in the cap-piece portion of the housing 18 permitting ready escape of the generated gases. In order to removably secure the housing in place, the upper end is threaded below the cap-piece, as at 21, so that the threaded section may cooperate with the threaded entrance of the filling opening. In this connection, it will be understood that other means for removably securing the housing 18 in the filling opening of the battery may be availed of, if desired.

The housing 18 provides a chamber 22 into which electrolyte may enter through ports 23 and 24 in the side and bottom walls, respectively, of the housing, the latter being supported so that the bottom wall is located just above the tops of the plates 12. As thus supported, the lower end of the housing is immersed in the reserve supply of electrolyte and electrolyte from said reserve supply enters the housing 18 so that under normal conditions the depth of electrolyte in the housing will be substantial, that is, in the vicinity of the line X, for example.

Hydrometric elements 25 in the form of weighted floats are accommodated in the chamber 22, the hydrometric elements being elongated and occupying individual compartments provided by radially-extending partitions 26 which are carried by a central post 27. The partitions 26, post 27 and the inner wall of the housing 18 separate the hydrometric elements from one another and provide vertical paths of movement for the said elements between the bottom of the housing 18 and the top wall 28 thereof. The latter, in accordance with the invention, is transparent and provides a window so that the hydrometric elements will be visible when their upper ends contact the window, as indicated in dotted lines in Figures 2 and 3. The window may, as illustrated in Figure 3, be in the form of an inserted glass disc if the plastic from which the housing 18 is formed is of the kind which is discolored by the electrolyte.

The upper ends, or heads, of the hydrometric elements are preferably differently colored with fluorescent paint, or other coating or identifying material so that each may be identified by distinguishing characteristics and so that all will be clearly visible at all times when occupying elevated positions. The hydrometric elements are weighted so that each will sink to the bottom of the chamber 22 when the specific gravity of the electrolyte falls below a predetermined value. For example, one of the floats, which may be identified by a yellow head, is so calibrated that it will sink to the bottom of the chamber 22 when the specific gravity of the electrolyte falls to 1.250 and will remain in such positions so long as the specific gravity of the electrolyte remains at this or any lower value; a second hydrometric element, which may be identified by a white head, is so calibrated that it will sink to the bottom of the chamber 22 when the specific gravity of the electrolyte falls to 1.200 and will remain in such position so long as the specific gravity of the electrolyte remains at this or any lower value; and a third hydrometric element, which may be identified by a red head, is so calibrated that it will sink to the bottom of the chamber 22 when the specific gravity of the electrolyte falls to 1.150 and will remain in such position so long as the specific gravity of the electrolyte remains at this or any lower value. The above values are on the assumption, of course, that the level of electrolyte is within its normal range.

From the foregoing, it will be apparent that when the specific gravity of the electrolyte is of a value of 1.250 or above, all three hydrometric elements will float and thereby provide a visual indication that the battery is well charged; when only two hydrometric elements float, the condition of the battery is fair; when only one hydrometric element floats, the condition of the battery is poor; and when none of the hydrometric elements float, the battery is either discharged or in need of additional water. Thus, each hydrometric element is adapted to respond to a different specific gravity of the electrolyte. It will be understood, of course, that when the heads of the hydrometric elements contact the inner surface of the window 28 constituted by the glass disc, as they will when the specific gravity of the electrolyte is of a value higher than that at which they sink, the elements will be clearly visible through the window 28. However, when any of the hydrometric elements sink to the bottom of the chamber 22, as they will when the specific gravity of the electrolyte falls below a predetermined value, the upper ends of said hydrometric elements will move away from the window and will become substantially invisible or so difficult to see as to indicate clearly that they have descended to the bottom of the chamber 22.

The indicating device is so designed that normal fluctuations in the level of the electrolyte in the battery may occur without operation of the hydrometric elements in the manner contemplated. As indicated in Figures 2 and 3, the normal high level of the electrolyte will be substantially at the line indicated at X (Figure 3). In accordance with the invention, the hydrometric elements 25 are so designed that when the electrolyte is at the high level line indicated, the upper ends of the hydrometric elements will contact the window 28 while the lower ends will displace considerably more electrolyte than the weight of the hydrometric elements. The amount of excess displaced electrolyte is predetermined so that the level of the electrolyte may fall a substantial distance, for example to the line Y (Figure 3), without a lowering of the hydrometric elements away from the window, assuming the specific gravity of the electrolyte to be higher than that at which the elements will sink. The charge indicator, therefore, has the advantage that the hydrometric elements will function in the desired manner despite fluctuations (within limits) in the electrolyte level such as normally occur during the use of the battery.

As a result of the forced contact between the upper ends of the hydrometric elements and the window, the said elements will maintain the underside of the glass window clear at the respective points of contact despite the accumulation thereon of electrolyte condensate or spray resulting from the gassing of the battery.

Various forms of hydrometric elements may be employed in connection with the indicating device.

The hydrometric element indicated at 25 (Figure 6) is in the form of a capsule and may be of glass or transparent plastic; the inner wall of the upper end of the capsule carrying a coating 29, of luminous paint of the kind available commercially under the name "Colorlite," or any other suitable indicating indicia. The capsule is weighted by a ball 30 which occupies the lower end of the capsule and which is held in place by a wad of cotton 31.

The hydrometric element 25b shown in Figure 7 includes a ball float 32 which is cemented or otherwise secured in the lower flaring end of a plastic tube 33. The upper end of the tube may, as in the case of the embodiment shown in Figure 6, be internally coated with luminous paint or any other suitable identifying medium or indicia.

The hydrometric element 25c shown in Figure 8 includes a ball float 34 which is suitably secured to the lower end of a stem 35 having an enlarged, rounded head 36 of colored plastic.

The hydrometric elements illustrated and described are similar in the respect that they are elongated and in the respect that they are so weighted that they will not be adversely affected by fluctuations (within normal limits) in the level of the electrolyte as a result of evaporation and filling.

It will be apparent from the foregoing, that the use of the indicating device of the invention involves no substantial change in the construction of a standard battery and that the device may be employed as an original part of a battery.

The indicating device has the further advantage that is does not interfere in any way with the filling of the battery in the usual manner; and in addition to the functions for which it is primarily designed, it also permits free escape of the generated gasses. A further advantage attained is that the device is substantially contained within the battery and does not increase any dimension thereof or interfere in any way with manipulation of the battery as may be required in installing it and removing it.

Although specific embodiments of the invention have been illustrated, it will be understood that such embodiments are intended by way of example only and that various modifications may be made within the purview of the appended claims.

I claim as my invention:

1. A vent plug hydrometer of the plural-element "basket" type adapted to be removably retained in the filling opening of a cell of an electric storage battery of the lead plate, high-level electrolyte reserve type comprising, a perforated container housing a plurality of hydrometric elements in angular spaced relation, said elements being each calibrated for a different predetermined specific gravity value, a screw plug having a transparent, flat top face and formed integrally with said container in vented relation with respect thereto, and an indicator member carried by each of said elements and having a differently identified end portion adapted to contact the underside of the top face of said screw plug upon response of said elements to said electrolyte when above a predetermined minimum specific gravity value.

2. A vent plug hydrometer of the plural-element "basket" type adapted to be removably retained in the filling opening of a cell of an electric storage battery of the lead plate, high-level electrolyte reserve type comprising, a perforated container housing a plurality of hydrometric elements in angular spaced relation, said elements being each calibrated for a different predetermined specific gravity value, a hollow screw plug having a transparent, flat top face and formed integrally with said container in vented relation with respect thereto, and an indicator member carried by each of said elements and having a differently colored free end portion adapted to contact the underside of the top face of said screw plug upon response of said elements to said electrolyte when above a predetermined minimum specific gravity value.

3. A combined vent plug and hydrometer device adapted to be removably secured in the filling opening of a cell of an electric storage battery of the lead plate, high-level electrolyte reserve type, comprising a hollow vented screw cap having a flat transparent top, a reduced tubular portion depending from said cap in co-axial relation to a point adjacent the plates in said cell, said tubular portion having a closed bottom end and being apertured to permit electrolyte to seek its own level in said tubular portion, means disposed within said tubular portion forming a plurality of angularly spaced parallel passages lengthwise thereof, a hydrometric element disposed in each of said passages and adapted to respond each to a different predetermined density value of said electrolyte when above a predetermined minimum value, and means carried by each of said elements adapted to contact the underside of said window when said elements float in said electrolyte, said last named means being differently identified, whereby to distinguish between said elements to obtain a visual indication of the specific gravity of said electrolyte.

4. A combined vent plug and hydrometer device adapted to be removably secured in the filling opening of a cell of an electric storage battery of the lead plate, high-level electrolyte reserve type, comprising a hollow vented screw cap having a flat transparent window secured in its top, a reduced tubular portion depending from the bottom of said cap in co-axial relation to a point adjacent the plates in said cell, said tubular portion having a closed bottom end and provided with a plurality of apertures to permit said electrolyte to seek its own level in said tubular portion, means disposed within said tubular portion forming a plurality of angularly spaced parallel passages lengthwise thereof, a hydrometric element disposed in each of said passages and adapted to respond each to a different predetermined density value of said electrolyte when above a predetermined minimum value, and means integral with each of said elements adapted to contact the underside of said window when said elements float in said electrolyte, said last named means being differently colored, whereby to distinguish between said elements to obtain a visual indication of the specific gravity of said electrolyte.

5. A combined vent plug and hydrometer device adapted to be removably secured in the filling opening of a cell of an electric storage battery of the lead plate, high-level electrolyte reserve type, comprising a hollow, vented screw cap having a flat transparent glass window secured in its top, a reduced tubular portion depending from the bottom of said cap in co-axial relation to a point adjacent the plates in said cell, said tubular portion having a closed bottom end and provided with a plurality of apertures to permit said electrolyte to seek its own level in said tubular portion, radial partitions within said tubular portion forming a plurality of angularly spaced parallel passages lengthwise thereof, a hydrometric element disposed in each of said passages and adapted to respond each to a different predetermined density value of said electrolyte when above a predetermined minimum value, and means integral with each of said elements adapted to contact the underside of said window upon selective flotation of said elements in said electrolyte, said last named means being differently colored, whereby to distinguish between said elements to obtain a visual indication of the specific gravity of said electrolyte.

6. A combined vent plug and hydrometric indicator adapted to be removably secured in the filling opening of an electric storage cell of the lead plate, high-level electrolyte reserve type, comprising a hollow screw-cap for said opening having a transparent glass plate secured in its uppermost edge portion to provide a window, said cap having a plurality of vent openings in its periphery below said window, a reduced tubular portion depending from the bottom of said cap to a point contiguous to the plates of said cell, said tubular portion having a closed bottom end provided with a plurality of apertures to provide a vent path to the openings in said screw cap and to permit electrolyte to seek its own level in said tubular portion, angularly spaced means within said tubular portion forming a plurality of passages lengthwise thereof, an elongated hydrometric element disposed in each of said passages and calibrated to respond each to a different predetermined electrolyte density value, said elements having a length greater than the distance between the minimum high-level of the electrolyte and the underside of said window whereby said elements will displace more electrolyte than their weight when they rise selectively and collectively into contact with the underside of said window in response to said electrolyte and thereby provide a visual indication of one of a plurality of predetermined density values of the electrolyte in said cell.

7. A combined vent plug and hydrometric indicator adapted to be removably secured in the filling opening of an electric storage cell of the lead plate, high-level electrolyte reserve type, comprising a hollow screw-cap for said opening having a window, said cap having a plurality of vent openings in its periphery below said window, a reduced tubular portion depending from the bottom of said cap to a point contiguous to the plates of said cell, said tubular portion having a closed bottom end provided with a plurality of apertures to provide a vent path to the openings in said screw-cap and to permit electrolyte to seek its own level in said tubular portion, means within said tubular portion forming a plurality of passages lengthwise thereof, an elongated hydrometric element disposed in each of said passages and calibrated to respond each to a different predetermined electrolyte density value, said elements having a length greater than the distance between the minimum high-level of the electrolyte and the underside of said window whereby said elements will displace more electrolyte than their weight when they rise selectively and collectively into contact with the underside of said window in response to said electrolyte and thereby provide a visual indication of one of a plurality of predetermined density values of the electrolyte in said cell.

8. A vent plug hydrometer of the plural element type adapted to be removably retained in the filling opening of a cell of an electric storage battery of the lead plate, high level electrolyte reserve type having a minimum and maximum level comprising a hollow vented screw plug having a transparent, flat top face, a plurality of hydrometric elements each being weighted to sink for a different predetermined specific gravity value of electrolyte, an extension carried by each hydrometric element having a length to reach from the minimum electrolyte level to the transparent top face of the screw plug, an indicator on the end of each extension, supporting means carried by and extending below the screw plug to support the hydrometric elements in adjacent relation and in the electrolyte, and the supporting means mounting the hydrometric elements for free vertical movement of an extent to lower the indicator an obscuring distance below the transparent top face whereby the indicator moves into contact with and away from the transparent top face.

9. A vent plug hydrometer of the plural element type adapted to be removably retained in the filling opening of a cell of an electric storage battery of the lead plate, high level electrolyte reserve type having a minimum and maximum level comprising a hollow vented screw plug having a transparent, flat top face, a plurality of vertical chambers carried by the screw plug in side by side relation and extending substantially below the minimum level of the electrolyte, each chamber having an aperture in the bottom thereof to permit said electrolyte to seek its own level therein, a hydrometric element in each chamber and each being weighted to sink for a different predetermined specific gravity value of electrolyte, an extension carried by each hydrometric element having a length to reach from the minimum electrolyte level to the transparent top face of the screw plug, an indicator on the end of each extension, the chambers carried by and extending below the screw plug to support the hydrometric elements in adjacent relation and in the electrolyte, and the chambers having a length for free vertical movement of the hydrometric elements for an extent to lower the indicator an obscuring distance below the transparent top face whereby the indicator moves into contact with and away from the transparent top face.

10. A vent plug hydrometer of the plural element type adapted to be removably retained in the filling opening of a cell of an electric storage battery of the lead plate, high level electrolyte reserve type having a minimum and maximum level comprising a hollow vented screw plug having a transparent, flat top face, a plurality of hydrometric elements each being weighted to sink for a different predetermined specific gravity value of electrolyte, an extension rod carried by each hydrometric element having a length to reach from the minimum electrolyte level to the transparent top face of the screw plug, a head on the end of each extension rod forming an indicator, supporting means carried by and extending below the screw plug to support the hydrometric elements in adjacent relation and in the electrolyte, and the supporting means mounting the hydrometric elements for free vertical movement of an extent to lower the indicator an obscuring distance below the transparent top face whereby the indicator moves into contact with and away from the transparent top face.

11. A vent plug hydrometer of the plural element type adapted to be removably retained in the filling opening of a cell of an electric storage battery of the lead plate, high level electrolyte reserve type having a minimum and maximum level comprising a hollow vented screw plug having a transparent, flat top face, a plurality of vertical chambers carried by the screw plug in side by side relation and extending substantially below the minimum level of the electrolyte, each chamber having an aperture in the bottom thereof to permit said electrolyte to seek its own level therein, an hydrometric element in each chamber and each being weighted to sink for a different predetermined specific gravity value of electrolyte, an extension rod carried by each hydrometric element having a length to reach from the minimum electrolyte level to the transparent top face of the screw plug, a head on the end of each extension forming an indicator, the chambers carried by and extending below the screw plug to support the hydrometric elements in adjacent relation and in the electrolyte, and the chambers having a length for free vertical movement of the hydrometric elements for an extent to lower the indicator an obscuring distance below the transparent top face whereby the indicator moves into contact with and away from the transparent top face.

ALEXANDER F. BABIS.

REFERENCES CITED

The following references are of record in the file of this patent:

UNITED STATES PATENTS

| Number | Name | Date |
|---|---|---|
| D. 150,328 | Appel | July 27, 1948 |
| 907,487 | Fleischer | Dec. 22, 1908 |
| 1,301,516 | Smith | Apr. 22, 1919 |
| 1,354,255 | Ivey et al. | Sept. 28, 1920 |
| 1,482,852 | Kloepper | Feb. 5, 1924 |
| 1,697,353 | Garrison | Jan. 1, 1929 |
| 2,469,560 | Jutte | May 10, 1949 |
| 2,484,163 | Gosheff | Oct. 11, 1949 |
| 2,512,757 | Westall | June 27, 1950 |

FOREIGN PATENTS

| Number | Country | Date |
|---|---|---|
| 271,635 | Great Britain | June 2, 1927 |
| 118,834 | Australia | Aug. 31, 1944 |